United States Patent
Todaka et al.

(10) Patent No.: US 10,268,422 B2
(45) Date of Patent: Apr. 23, 2019

(54) PRINTER AND CONTROL METHOD

(71) Applicant: SEIKO EPSON CORPORATION, Tokyo (JP)

(72) Inventors: Shingo Todaka, Matsumoto (JP); Noboru Usui, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/615,463

(22) Filed: Jun. 6, 2017

(65) Prior Publication Data

US 2017/0351465 A1    Dec. 7, 2017

(30) Foreign Application Priority Data

Jun. 7, 2016 (JP) .................................. 2016-113542

(51) Int. Cl.
*G06F 3/12* (2006.01)
*G06K 15/02* (2006.01)

(52) U.S. Cl.
CPC .......... *G06F 3/1204* (2013.01); *G06F 3/1234* (2013.01); *G06F 3/1237* (2013.01); *G06F 3/1258* (2013.01); *G06F 3/1286* (2013.01); *G06K 15/1805* (2013.01); *G06K 15/1806* (2013.01)

(58) Field of Classification Search
CPC .................................................. G06F 3/1204
USPC ........................................................ 358/1.13
See application file for complete search history.

(56) References Cited

U.S. PATENT DOCUMENTS

| | | | | |
|---|---|---|---|---|
| 2004/0257605 | A1* | 12/2004 | Hayashi | H04N 1/32101 358/1.14 |
| 2009/0066737 | A1* | 3/2009 | Sakurai | B41J 2/1652 347/9 |
| 2010/0079799 | A1 | 4/2010 | Toshima et al. | |
| 2012/0141150 | A1* | 6/2012 | Noh | G03G 15/2039 399/33 |
| 2015/0172494 | A1* | 6/2015 | Kozuka | H04N 1/00896 358/1.14 |

FOREIGN PATENT DOCUMENTS

| | | |
|---|---|---|
| JP | 2001-071597 A | 3/2001 |
| JP | 2006-231078 A | 9/2006 |
| JP | 2007-151074 A | 6/2007 |
| JP | 2008-206034 A | 9/2008 |
| JP | 2010-108581 A | 5/2010 |
| JP | 2014-146239 A | 8/2014 |

* cited by examiner

*Primary Examiner* — Jacky X Zheng
(74) *Attorney, Agent, or Firm* — Foley & Lardner LLP (57) ABSTRACT

A printer enables easily changing settings. The printer has storage 20c that stores settings information related to the printer 10; and a controller 20 changes, based on the power supply to the printer 10 turning on or off, settings information stored in the storage 20c.

18 Claims, 5 Drawing Sheets

PRINTER AND CONTROL METHOD

This application claims priority under 35 U.S.C. § 119 to Japanese Patent Application No. 2016-113542 filed on Jun. 7, 2016, the entire disclosure of which is expressly incorporated by reference herein.

BACKGROUND

1. Technical Field

The present invention relates to a printer and a control method, and relates more specifically to a printer and a control method enabling the printer to easily change settings.

2. Related Art

Printers having a notification unit (alarm), and enable changing settings, such as enabling and disabling the notification unit, are known from the literature. See, for example, JP-A-2014-146239.

However, to change a setting, such as enabling/disabling a notification unit, as described in JP-A-2014-146239, the printer must be connected to a host computer, a utility or other application program booted on the connected host computer, and a settings (configuration) screen displayed on the display of the host computer. This is a complicated process, however, and quickly and appropriately changing a setting, such as enabling/disabling the notification unit of a printer that is used in the kitchen of a restaurant, for example, is difficult.

SUMMARY

The present invention is directed to solving this problem, and an objective of the invention is to provide a printer that makes changing settings simple.

To achieve the foregoing objective, one aspect of the invention is a printer including storage configured to store settings information related to a printer; and a controller configured to change settings information stored in the storage based on supplying or interrupting supplying power to the printer.

This configuration enables providing a printer that, by the action of a controller that changes settings information based on whether printer power is turned on or off, can easily change settings information by simply turning the printer power on or off.

Preferably, a printer according to another aspect of the invention has a power switch able to turn the power supply on or off; the controller changing the settings information based on the power switch turning the power supply on or off.

This configuration enables easily changing settings information by simply operating the power switch.

Preferably, a printer according to another aspect of the invention has a power plug able to turn the power supply on or off by plugging into or unplugging from a commercial power supply outlet; the controller changing the settings information based on the power supply turning on or off by plugging in or unplugging the power plug from the outlet.

This configuration enables easily changing settings information by simply plugging a power plug into a power socket or unplugging the power plug from the socket.

Preferably, in a printer according to another aspect of the invention, the storage stores a count of the number of times the power turned on or off; and the controller changes the settings information based on the count of the number of times the power turned on or off stored in the storage.

This configuration enables easily changing settings information based on the number of times the power turned on or off.

Preferably, a printer according to another aspect of the invention has a notification unit that reports information; the controller changing, based on the power turning on or off, settings information related to the notification unit stored in the storage.

This configuration enables easily changing settings information related to a notification unit by simply turning the power on or off.

Preferably, a printer according to another aspect of the invention connects to a host computer; and the controller changes, based on the power turning on or off, settings information indicating whether or not to execute a command received from the host computer and instructing operation of the notification unit.

This configuration enables easily changing, by simply turning the power on or off, settings information indicating whether or not to execute a command received from a host computer and instructing the notification unit.

Preferably, a printer according to another aspect of the invention connects to a host computer; the notification unit is externally connected through an interface of the printer, and operates based on a drawer control command instructing controlling a drawer and received from the host computer through the interface; and the controller changes, based on the power turning on or off, settings information instructing whether or not to execute the drawer control command.

This configuration enables easily changing, by simply turning the power on or off, settings information indicating whether or not to execute a drawer control command received from a host computer.

Preferably, in a printer according to another aspect of the invention, the notification unit reports at least one of the printer printing an image, completion of printing the image, and an error occurring while printing the image.

This configuration enables reporting at least one of the printer printing an image, completion of printing the image, and an error occurring while printing the image.

Preferably, in a printer according to another aspect of the invention, the controller changes print settings information based on the power turning on or off.

This configuration enables easily changing print settings information by simply turning the power on or off.

Another aspect of the invention is a control method of a printer storing settings information related to a printer, including: changing stored settings information based on supplying or interrupting supplying power to the printer.

This aspect of the invention provides a control method enabling easily changing settings information by simply turning the power supply to the printer on or off.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a flow chart illustrating an example of an operation in which a controller 20 changes a printer setting based on the printer 10 power turning on.

DESCRIPTION OF EMBODIMENTS

A preferred embodiment of the present invention is described below with reference to the accompanying figures. Note that like parts are identified by like reference symbols in the figures, and redundant description there is omitted.

Figure 1:
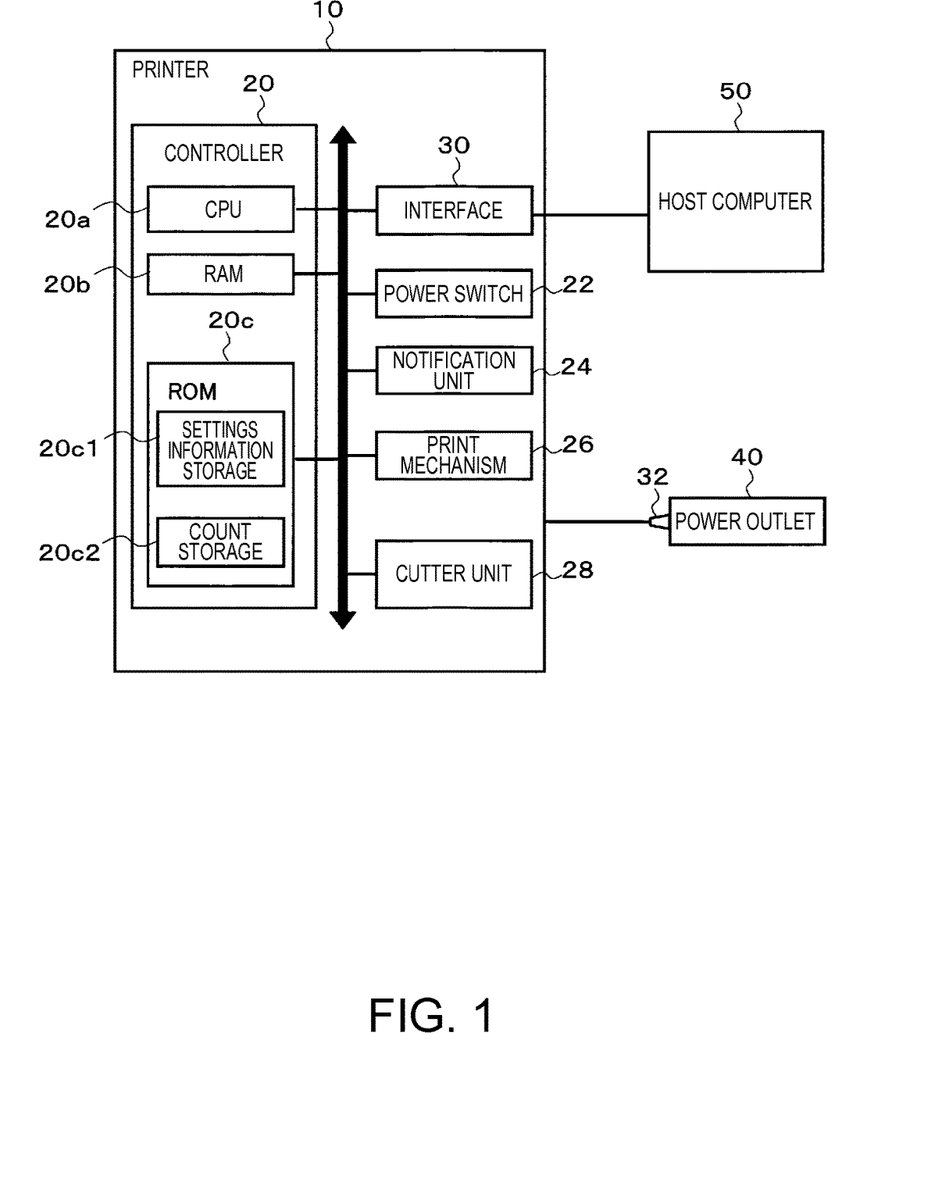
FIG. 1 is a block diagram illustrating the basic configuration of a printer 10 as an example of a printer, and employing the control method, of the invention.

FIG. 1 illustrates the basic configuration of a printer 10 described as an example of a printer according to the invention and employing the control method of the invention.

The printer 10 in this example is a kitchen printer that is used in the kitchen of a restaurant to print order tickets.

As shown in FIG. 1, hardware components of the printer 10 include a controller 20, a power switch 22, notification unit 24, print mechanism 26, cutter unit 28, interface 30, and power plug 32.

The power switch 22, notification unit 24, print mechanism 26, cutter unit 28, and interface 30 are connected to the controller 20.

The controller 20 includes a CPU 20a, RAM 20b, and ROM 20c. RAM 20b is used as working memory for the CPU 20a to execute operations and processes. The ROM 20c is, for example, rewritable nonvolatile memory such as flash ROM, and stores firmware or other control program. The ROM 20c includes settings information storage 20c1, and count storage 20c2.

Based on the printer 10 being turned on by operating the power switch 22, the controller 20 changes the setting that enables or disables the notification unit 24. This operation of the controller 20 is described further below.

Information indicating that the notification unit 24 is enabled (can report information), or information indicating that the notification unit 24 is disabled (does not report information), is stored in the settings information storage 20c1. The number of times the power turns on (referred to below as the power supply count) is stored in the count storage 20c2.

The power switch 22 is a power switch that is able to turn the power supply to the printer 10 on or off, and may be a toggle switch or pushbutton switch, for example.

The notification unit 24 is, for example, a piezoelectric buzzer or other type of buzzer. The buzzer may be an internal buzzer, or an external buzzer that is externally connected through a specific interface (such as a drawer kick-out connector, not shown). The notification unit 24 sounds in response to a drive signal supplied from the controller 20.

The print mechanism 26 includes, for example, a printhead, media conveyance mechanism, and media cutting mechanism (all not shown in the figures).

The cutter unit 28 has a cutter drive mechanism that moves a movable knife in a line back and forth relative to a fixed knife to cut the roll paper between the knives.

The printer 10 can connect to a host computer 50 through the interface 30. The interface 30 functions as a receiver for receiving print jobs sent from the host computer 50. A print job in this example is data for printing an order ticket on roll paper, and includes a buzzer command. The buzzer command is an example of a command instructing operation of the notification unit in the invention. Note that the cut command may also include a buzzer command.

The power plug 32 is a power supply plug that turns the power supply to the printer 10 on and off by being plugged into or disconnected from a commercial power outlet 40. The power plug 32 may be a common power plug. The power supply circuit (not shown in the figure) connects to the power plug 32. An AC adapter (not shown in the figure) is disposed between the power plug 32 and power supply circuit. The power supply circuit converts the power input through the power plug 32 (or through the power plug 32 and AC adapter) to power appropriate to the controller 20, and supplies power to the controller 20.

An example of the operation of the printer 10 (control method) is described next with reference to the figures.

Figure 2:
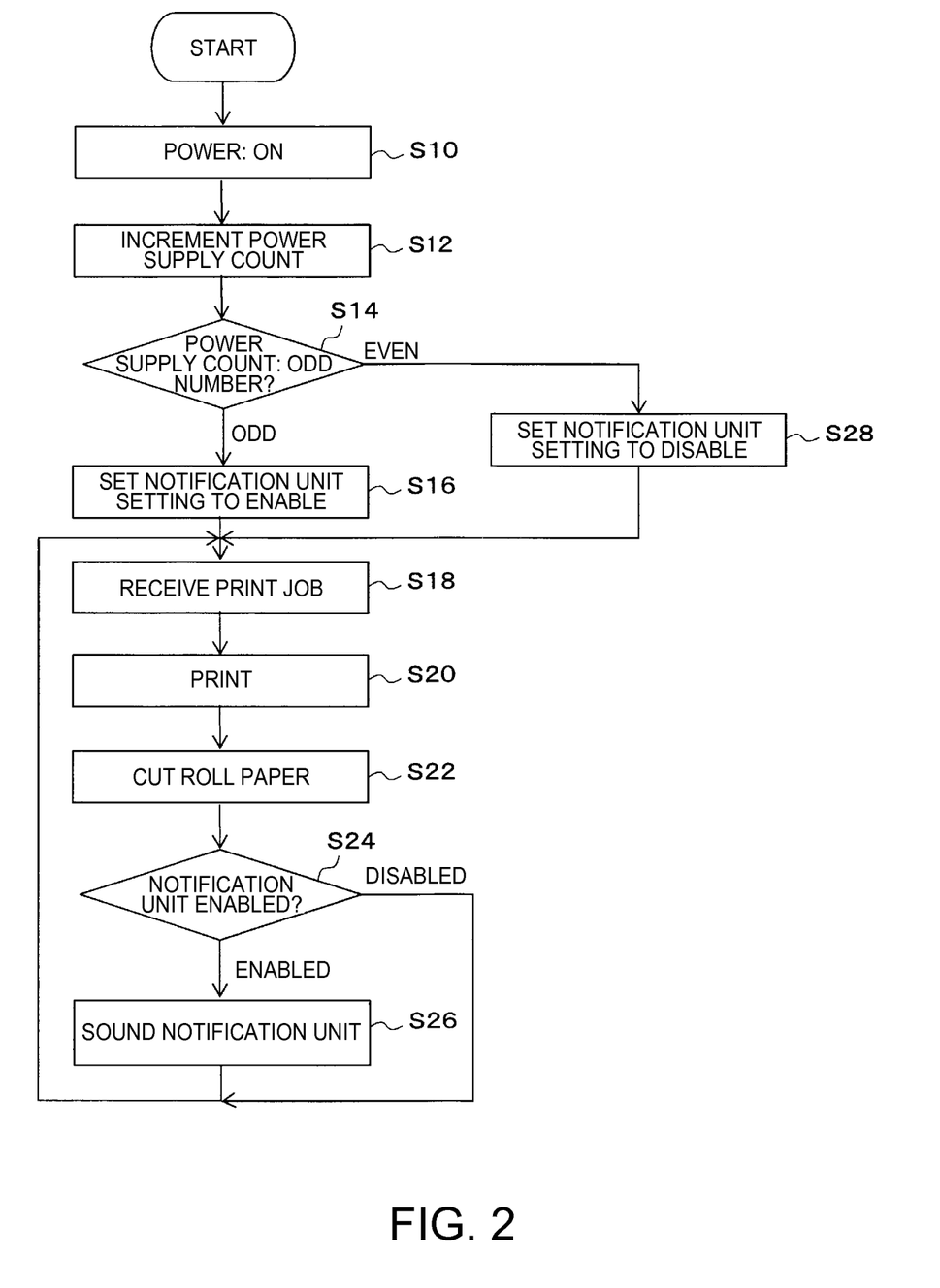
FIG. 2 is a flow chart illustrating an example of the operation (control method) changing a setting of the notification unit 24 based on the printer 10 power turning on in response to operation of a power switch 22.

FIG. 2 is a flow chart describing an example of an operation (control method) that changes the setting of the notification unit 24 based on the supply of power to the printer 10 in response to operation of the power switch 22.

The operation described below is enabled by the controller 20 executing firmware read from ROM 20c. Note that the operation described below starts with the notification unit 24 setting stored in the settings information storage 20c1 already set to Enable, and the number of times stored in the count storage 20c2 set to 0.

First, power is supplied to the printer 10 by turning the power switch 22 on (step S10). Note that turning the printer 10 power on means that power output from the power supply circuit is supplied to the controller 20, print mechanism 26, cutter unit 28, interface 30, and other parts.

Next, the controller 20 adds 1 to the power supply count stored in the count storage 20c2 (step S12).

Next, the controller 20 determines if the power supply count stored in the count storage 20c2 is odd or even (step S14).

Because the power supply count is now 1 as a result of adding 1 to the power supply count stored in the count storage 20c2 in step S12, the controller 20 determines that the power supply count stored in the count storage 20c2 is odd (step S14: odd).

Next, when the power supply count stored in the count storage 20c2 is determined to be odd (step S14: odd), the controller 20 sets the notification unit 24 to Enabled (step S16). More specifically, the controller 20 stores information in the settings information storage 20c1 indicating that the notification unit 24 is enabled. This is an example of the change-setting step of the invention. When the notification unit 24 is set to enabled in step S16, the Enabled setting may also be reported by appropriately driving an LED or other indicator, a display device such as an LCD panel, or sounding an audible warning.

Next, when a print job sent from the host computer 50 is received (step S18), the controller 20 controls the print mechanism 26 based on the print job to print on the roll paper and produce an order ticket (step S20). If the controller 20 detects a cut command in the print job, it also controls the cutter unit 28 to cut the roll paper by executing the cut command (step S22).

Next, the controller 20 determines whether or not the notification unit 24 is set to enabled (step S24). More specifically, the controller 20 determines if settings information indicating that the notification unit 24 is enabled is stored in the settings information storage 20c1.

Because the notification unit 24 was set to Enabled in step S16, the controller 20 determines that the notification unit 24 is enabled (step S24: Enabled).

Next, if the notification unit 24 is determined to be enabled (step S24: Enabled) and a buzzer command is detected in the print job, the controller 20 causes the notification unit 24 to sound by executing the buzzer command (step S26).

Thereafter, the controller 20 repeats step S20 to step S26 each time the interface 30 receives a print job sent from the host computer 50 (step S18).

The power supply to the printer 10 may then be turned off by turning the power switch 22 off, and the power then turned on again by turning the power switch 22 on (step S10). Note that turning the power to the printer 10 off means the power supply circuit stopping output of power, and, as a result, power no longer being supplied to the controller 20, print mechanism 26, cutter unit 28, interface 30, and other parts.

The controller 20 then again adds 1 to the power supply count stored in the count storage 20c2 (step S12).

Next, the controller 20 determines if the power supply count stored in the count storage 20c2 is odd or even (step S14).

Because the power supply count is now 2 as a result of adding 1 to the power supply count stored in the count storage 20c2 in step S12, the controller 20 determines that the power supply count stored in the count storage 20c2 is even (step S14: even).

Next, when the power supply count stored in the count storage 20c2 is determined to be even (step S14: even), the controller 20 sets the notification unit 24 to Disabled (step S28) More specifically, the controller 20 stores information in the settings information storage 20c1 indicating that the notification unit 24 is disabled. When the notification unit 24 is set to disabled in step S28, the Disabled setting may also be reported by appropriately driving an LED or other indicator, a display device such as an LCD panel, or sounding an audible warning.

Next, when a print job sent from the host computer 50 is received (step S18), the controller 20 controls the print mechanism 26 based on the print job to print on the roll paper and produce an order ticket (step S20). If the controller 20 detects a cut command in the print job, it also controls the cutter unit 28 to cut the roll paper by executing the cut command (step S22).

Next, the controller 20 determines whether or not the notification unit 24 is set to enabled (step S24). More specifically, the controller 20 determines if settings information indicating that the notification unit 24 is enabled is stored in the settings information storage 20c1.

Because the notification unit 24 was set to Disabled in step S28, the controller 20 determines that the notification unit 24 is disabled (step S24: Disabled).

Next, if the notification unit 24 is determined to be disabled (step S24: Disabled), the controller 20 does not sound the notification unit 24 (step S24: Disabled).

Thereafter, the controller 20 repeats step S20 to step S26 each time the interface 30 receives a print job sent from the host computer 50 (step S18).

The setting of the notification unit 24 can thus be changed as described above by simply turning the power to the printer 10 on by operating the power switch 22.

As described above, this embodiment of the invention enables easily changing the setting of the notification unit 24 by simply operating the power switch 22.

This embodiment of the invention also enables changing the notification unit 24 setting based on the number of times the printer 10 power turns on. For example, the notification unit 24 setting can be changed to disabled when the number of times the printer 10 power turns on is even, and the notification unit 24 setting can be changed to enabled when the number of times the printer 10 power turns on is odd. Note that this can obviously be reversed so that the notification unit 24 setting is changed to disabled when the number of times the printer 10 power turns on is odd, and the notification unit 24 setting can be changed to enabled when the number of times the printer 10 power turns on is even. This also applies to the other examples described below.

Variations of this embodiment are described below.

The foregoing embodiment describes the setting that the controller 20 changes based on the power input to the printer 10 being a setting of a notification unit 24, but the invention is not so limited. The setting the controller 20 changes based on the power input to the printer 10 may be a setting other than a setting of the notification unit 24.

For example, the setting the controller 20 changes based on the power input to the printer 10 may be a setting controlling whether or not to execute a command (such as the buzzer command described above) received from the host computer 50 and instructing operation of a buzzer, that is, a setting that enables or disables the command.

An example of an operation whereby the controller 20 changes, based on the printer 10 power turning on, a setting determining whether or not a command received from the host computer 50 and instructing operation of a buzzer executes is described next with reference to FIG. 3.

Figure 3:
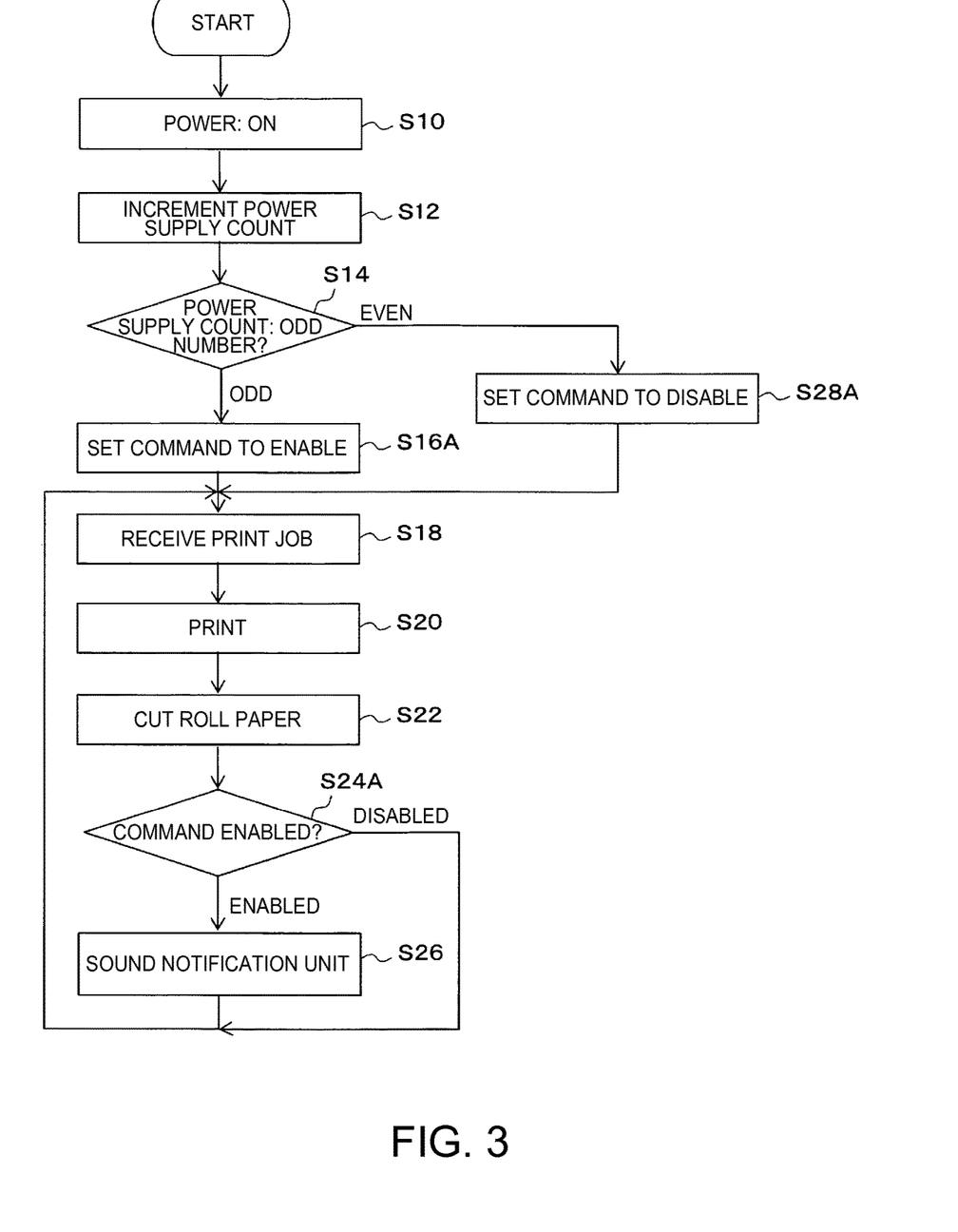
FIG. 3 is a flow chart illustrating an example of an operation changing the setting of whether or not to execute a command that instructs operating a buzzer and is received from a host computer 50.

FIG. 3 is a flow chart describing an example of an operation that changes the setting determining whether or not a command received from the host computer 50 and instructing operation of a buzzer executes.

In FIG. 3, step S16A, step S24A, and step S28A replace step S16, step S24, and step S28 in the flow chart in FIG. 2. The flow chart in FIG. 3 is otherwise the same as the flow chart in FIG. 2. The following description focuses on the differences with the flow chart in FIG. 2, and further description of operations that are the same as in the flow chart in FIG. 2 is simplified or omitted.

As shown in FIG. 3, if the controller 20 determines the power supply count stored in the count storage 20c2 is odd (step S14: odd), it enables the command (step S16A). More specifically, the controller 20 stores information in the settings information storage 20c1 indicating that the command is enabled. When the command is enabled, the Enabled setting may also be reported by appropriately driving an LED or other indicator, a display device such as an LCD panel, or sounding an audible warning.

If the controller 20 determines the power supply count stored in the count storage 20c2 is even (step S14: even), it disables the command (step S28A). More specifically, the controller 20 stores information in the settings information storage 20c1 indicating that the command is disabled. When the command is disabled, the Disabled setting may also be reported by appropriately driving an LED or other indicator, a display device such as an LCD panel, or sounding an audible warning.

When the controller 20 determines the command is enabled (step S24A: Enable), more specifically, when settings information indicating that the command is enabled is stored in the settings information storage 20c1, and a command (such as the buzzer command described above) received from the host computer 50 and instructing operation of a buzzer is included in a print job, the controller 20 executes the command to drive the notification unit 24 (step S26).

However, if the controller 20 determines the command is disabled (step S24A: Disable), more specifically, when settings information indicating that the command is disabled is stored in the settings information storage 20c1, and a command (such as the buzzer command described above) received from the host computer 50 and instructing operation of a buzzer is included in a print job, the controller 20 does not execute the command (for example, discards the command) and does not drive the notification unit 24.

Note that the command received from the host computer 50 and instructing an operation, in this example, operating the buzzer, is not so limited and may be a drawer control command instructing controlling a drawer (not shown in the figure), for example. In this case, the notification unit 24 must be externally connected to the printer 10 through a specific interface (such as a drawer kick-out connector, not shown).

The drawer control command is a command controlling a drawer connected through the drawer kick-out connector, and is a command for moving the drawer tray from inside the drawer unit to the outside (that is, opening the drawer). The drawer control command includes parameters specifying the period for outputting a High level voltage through the drawer kick-out connector to the drawer, and the period for outputting a Low level voltage to the drawer, and causes the drawer to move to the open position by outputting the High level voltage. In this example, the notification unit 24 operates based on the parameters contained in the drawer control command. More specifically, the notification unit 24 may be configured to operate while the High level voltage is output based on the drawer control command, and not operate otherwise.

This configuration enables changing, based on the printer 10 power turning on in response to operation of the power switch 22, a setting controlling whether or not a command received from the host computer 50 and instructing operation of the notification unit 24 executes, that is, changing the enabled or disabled state of the command setting.

As described above, this embodiment of the invention enables easily changing the setting controlling whether or not a command received from the host computer 50 and instructing operation of the notification unit 24 executes, that is, changing the enabled or disabled state of the command setting, by simply operating the power switch 22.

The setting the controller 20 changes based on the power input to the printer 10 may be also be a print setting. The print setting may include, for example, one or more of a paper setting indicating the size and type of paper; the paper width; printing area; printing speed; font settings; and margin settings.

An example of an operation whereby the controller 20 changes, based on the printer 10 power turning on, a print setting is described next with reference to FIG. 4.

Figure 4:
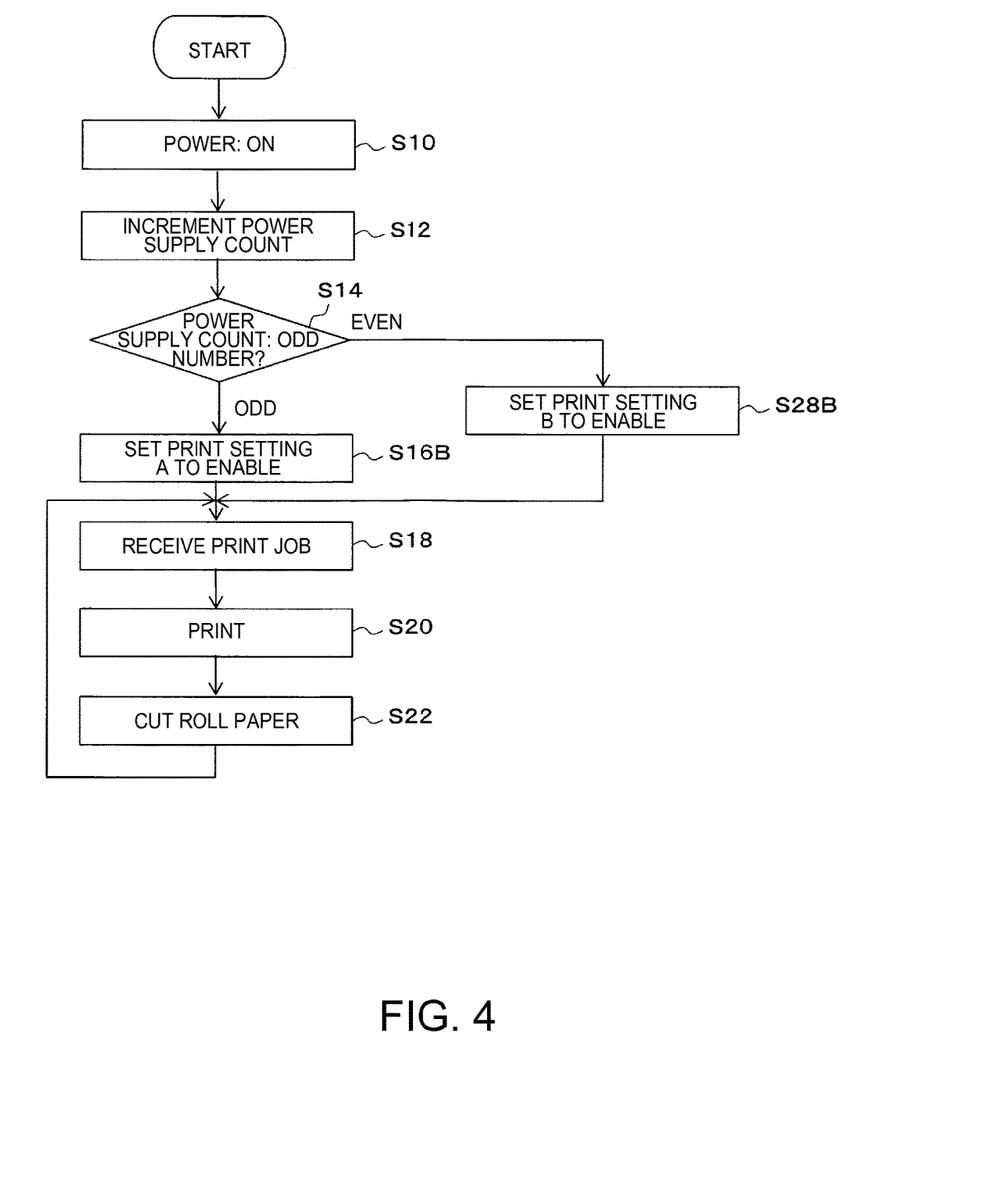

FIG. 4 is a flow chart describing an example of an operation that changes a print setting based on the printer 10 power turning on. Note that the operation described below assumes that a print setting A and a different print setting B are previously stored in ROM 20c or other storage.

In FIG. 4, step S16B and step S28B replace step S16 and step S28 in the flow chart in FIG. 2, and step S24 and S26 are omitted. The flow chart in FIG. 4 is otherwise the same as the flow chart in FIG. 2. The following description focuses on the differences with the flow chart in FIG. 2, and further description of operations that are the same as in the flow chart in FIG. 2 is simplified or omitted.

As shown in FIG. 4, if the controller 20 determines the power supply count stored in the count storage 20c2 is odd (step S14: odd), it enables print setting A (step S16B). More specifically, the controller 20 stores information in the settings information storage 20c1 indicating that the print setting A is enabled. When print setting A is enabled, the Enabled setting may also be reported by appropriately driving an LED or other indicator, a display device such as an LCD panel, or sounding an audible warning.

Based on the print job received in step S18 and the print setting A, the controller 20 controls the print mechanism 26 to print on the roll paper and product an order ticket (step S20).

If the controller 20 determines the power supply count stored in the count storage 20c2 is even (step S14: even), it enables print setting B (step S28B). More specifically, the controller 20 stores information in the settings information storage 20c1 indicating that the print setting B is enabled. When print setting B is enabled, the Enabled setting may also be reported by appropriately driving an LED or other indicator, a display device such as an LCD panel, or sounding an audible warning.

Based on the print job received in step S18 and the print setting B, the controller 20 then controls the print mechanism 26 to print on the roll paper and product an order ticket (step S20).

As described above, this configuration enables changing a print setting based on the printer 10 power turning on in response to operation of the power switch 22.

As described above, this configuration enables changing a print setting by simply operating the power switch 22.

In the embodiments and variations described above, each time the printer 10 power is turned on by operating the power switch 22, the controller 20 adds 1 to the power supply count stored in the count storage 20c2, and changes a setting (the notification unit 24 setting in this example) based on the power supply count stored in the count storage 20c2, but the invention is not so limited.

For example, each time the printer 10 power is turned off by operating the power switch 22, the controller 20 may add 1 to the power supply count stored in the count storage 20c2, and change a setting (the notification unit 24 setting in this example) based on the power supply count stored in the count storage 20c2.

Further alternatively, the controller 20 may change, with no relationship to the power supply count stored in the count storage 20c2, a current setting to a different setting.

An example of an operation whereby the controller 20 changes, with no relationship to the power supply count stored in the count storage 20c2, a current setting to a different setting is described next with reference to FIG. 5.

Figure 5:
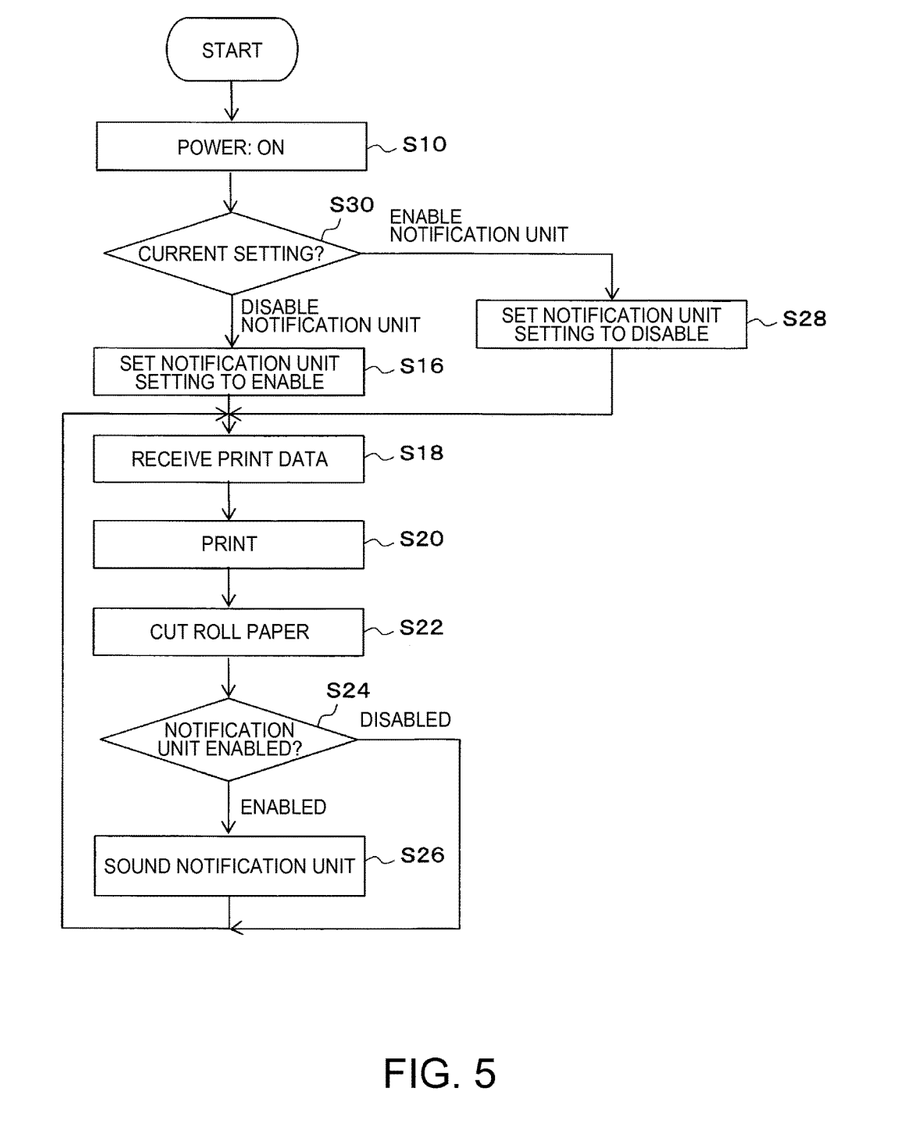
FIG. 5 is a flow chart illustrating an example of an operation whereby the controller 20 changes a current setting to a different setting.

FIG. 5 is a flow chart describing an example of an operation whereby the controller 20 changes, with no relationship to the power supply count stored in the count storage 20c2, a current setting to a different setting.

Note that the flow chart in FIG. 5 omits step S12 and step S14 in the flow chart in FIG. 2, and adds a new step S30 between step S10 and step S16. The flow chart in FIG. 5 is otherwise the same as the flow chart in FIG. 2. The following description focuses on the differences with the flow chart in FIG. 2, and further description of operations that are the same as in the flow chart in FIG. 2 is simplified or omitted.

As shown in FIG. 5, if the controller 20 determines that the current setting stored in the settings information storage 20c1 is that the notification unit 24 is disabled (step S30: notification unit→Disabled), the controller 20 changes the setting from the current setting, that is, sets the notification unit 24 to Enabled (step S16). More specifically, the controller 20 stores settings information indicating that the notification unit 24 is Enabled in the settings information storage 20c1.

However, if the controller 20 determines that the current setting stored in the settings information storage 20c1 is that the notification unit 24 is enabled (step S30: notification unit→Enabled), the controller 20 changes the setting from the current setting, that is, sets the notification unit 24 to Disabled (step S28). More specifically, the controller 20 stores settings information indicating that the notification unit 24 is Disabled in the settings information storage 20c1.

This embodiment enables changing, with no relationship to the power supply count stored in the count storage 20c2, a current setting to a different setting. As a result, ROM 20c and processes related thereto (such as step S12 and step S14) can be omitted.

The embodiments and variations described above describe the controller 20 changing a setting (such as a setting of the notification unit 24) based on the printer 10 power being turned on by operating the power switch 22, but the invention is not so limited.

For example, the controller 20 may change a setting (such as a setting of the notification unit 24) based on the printer 10 power being turned on by the power plug 32 plugging into the power outlet 40.

This enables easily changing a setting (such as a setting of the notification unit 24) by simply plugging the power plug 32 into the power outlet 40.

The controller 20 may also change a setting (such as a setting of the notification unit 24) based on the printer 10 power being turned off by operating the power switch 22 or by unplugging the power plug 32 from the power outlet 40.

The foregoing embodiments and variations describe the notification unit 24 reporting when printing an order ticket (image) ends, that is, the controller 20 controlling the cutter unit 28 to cut the roll paper (step S22) and then sounding the notification unit 24 (step S24: Enable, step S26), but the invention is not so limited.

For example, the notification unit 24 may be driven to report when printing an order ticket (image) is in progress, or when an error occurs while printing an order ticket (image). More specifically, the notification unit 24 may report when any one of specific events occurs, such as when printing an image is in progress, when printing an image ends, or when an error occurs while printing an image.

The foregoing embodiments and variations describe using a buzzer that sounds an audible report as the notification unit 24, but the invention is not so limited. For example, a display unit such as LED indicators or an LCD panel may be used as the notification unit 24.

The invention is described in the embodiments and variations above using the example of a kitchen printer that prints order tickets, but the invention is not so limited and can obviously be applied to printers other than kitchen printers.

Values used in the foregoing embodiments are also used only for example, and different values can obviously be used as appropriate.

The foregoing embodiment is in all aspects only an example. The invention should not be understood as being limited by the foregoing description. The invention can be embodied in many other ways without departing from the spirit or main features described above.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

TEXT IN THE FIGURES

FIG. 1
PRINTER 10
CONTROLLER 20
POWER SWITCH 22
NOTIFICATION UNIT 24
PRINT MECHANISM 26
CUTTER UNIT 28
INTERFACE 30
CPU 20a
RAM 20b
SETTINGS INFORMATION STORAGE 20c1
COUNT STORAGE 20c2
HOST COMPUTER 50
POWER OUTLET 40
FIG. 2
START
S10 POWER: ON
S12 INCREMENT POWER SUPPLY COUNT
S14 POWER SUPPLY COUNT: ODD NUMBER?
ODD
S16 SET NOTIFICATION UNIT SETTING TO ENABLE
S18 RECEIVE PRINT JOB
S20 PRINT
S22 CUT ROLL PAPER
S24 NOTIFICATION UNIT ENABLED?
DISABLED
ENABLED
S26 SOUND NOTIFICATION UNIT
EVEN
S28 SET NOTIFICATION UNIT SETTING TO DISABLE
END
FIG. 3
START
S10 POWER: ON
S12 INCREMENT POWER SUPPLY COUNT
S14 POWER SUPPLY COUNT: ODD NUMBER?
ODD
S16A SET COMMAND TO ENABLE
S18 RECEIVE PRINT JOB
S20 PRINT
S22 CUT ROLL PAPER
S24A COMMAND ENABLED?
DISABLED
ENABLED
S26 SOUND NOTIFICATION UNIT
EVEN
S28A SET COMMAND TO DISABLE
END
FIG. 4
START
S10 POWER: ON
S12 INCREMENT POWER SUPPLY COUNT
S14 POWER SUPPLY COUNT: ODD NUMBER?
ODD
S16B SET PRINT SETTING A TO ENABLE

S18 RECEIVE PRINT JOB
S20 PRINT
S22 CUT ROLL PAPER
EVEN
S28B SET PRINT SETTING B TO ENABLE
END
FIG. 5
START
S10 POWER: ON
S30 CURRENT SETTING?
DISABLE NOTIFICATION UNIT
S16 SET NOTIFICATION UNIT SETTING TO ENABLE
S18 RECEIVE PRINT DATA
S20 PRINT
S22 CUT ROLL PAPER
S24 NOTIFICATION UNIT ENABLED?
DISABLED
ENABLED
S26 SOUND NOTIFICATION UNIT
ENABLE NOTIFICATION UNIT
S28 SET NOTIFICATION UNIT SETTING TO DISABLE
END

What is claimed is:

1. A printer comprising:
storage configured to store settings information related to a printer in a settings storage, and to store in a counter storage either (i) a count of a number of times power to the printer has been turned on, or (ii) a count of a number of times power to the printer has been turned off; and
a controller configured to:
access the count storage to retrieve the count;
change the settings information stored in the settings storage based on the count;
receive a command from a computing device;
retrieve the settings information from the settings storage;
determine whether to execute the command based on the settings information; and
execute or not execute the command based on the determination,
wherein the command is included in a print job received from the computing device.

2. The printer described in claim 1, further comprising:
a power switch configured to turn the power to the printer on or off, wherein
the controller is configured to update the count based on the power switch turning the power supply on or off.

3. The printer described in claim 1, further comprising:
a power plug configured to turn the power to the printer on or off by plugging into or unplugging from a commercial power supply outlet, wherein
the controller is configured to update the count based on the power supply turning on or off by plugging in or unplugging the power plug from the outlet.

4. The printer described in claim 1, further comprising:
a notification unit configured to report information;
wherein the settings information is related to the notification unit.

5. The printer described in claim 4, wherein:
the printer is configured connect to a host computer; and
the settings information indicates whether or not to execute a command received from the host computer that instructs operation of the notification unit.

6. The printer described in claim 4, wherein:
the printer is configured connect to a host computer;
the notification unit is externally connected through an interface of the printer, and is configured to operate based on a drawer control command instructing controlling a drawer and received from the host computer through the interface; and
the settings information indicates whether or not to execute the drawer control command.

7. The printer described in claim 4, wherein:
the notification unit is configured to report at least one of the printer printing an image, completion of printing the image, and an error occurring while printing the image.

8. The printer described in claim 1, wherein:
the setting information is print settings information.

9. The printer described in claim 1, wherein the controller is configured to switch the setting information alternately between information indicating that a functionality or component is enabled and information indicating that the functionality or component unit is disabled, every time the count is changed.

10. A control method of a printer storing settings information related to a printer, comprising:
storing, in a settings storage, the settings information related to the printer;
storing, in a count storage, a count of either (i) a count of a number of times power to the printer has been turned on, or (ii) a count of a number of times power to the printer has been turned off;
accessing the count storage to retrieve the count;
changing the stored settings information based on the count, the changing comprising switching the setting information alternately between information indicating that a functionality or component is enabled and information indicating that the functionality or component is disabled, every time the count is changed;
receiving a command from a computing device;
retrieving the settings information from the settings storage;
determining whether to execute the command based on the settings information; and
executing or not executing the command based on the determination.

11. The control method of a printer described in claim 10, wherein:
the printer includes a power switch configured to turn the power to the printer on or off;
the method further comprising updating the count based on the power to the printer turning on or off by an operation of the power switch.

12. The control method of a printer described in claim 10, wherein:
the printer includes a power plug configured to turn the power supply on or off by plugging into or unplugging from a commercial power supply outlet;
the method further comprising updating the count based on the power to the printer turning on or off by plugging in or unplugging the power plug from the outlet.

13. The control method of a printer described in claim 10, wherein:
the printer includes a notification unit configured to report information,
wherein the settings information is related to the notification unit stored in the storage.

14. The control method of a printer described in claim 13, wherein:
the printer connects to a host computer; and the settings information indicates whether or not to execute a command received from the host computer that instructs operation of the notification unit.

15. The control method of a printer described in claim 13, wherein:

the printer connects to a host computer;

the notification unit is externally connected through an interface of the printer, and is configured to operate based on a drawer control command received from the host computer through the interface and instructing controlling a drawer;

wherein the settings information instructing whether or not to execute the drawer control command.

16. The control method of a printer described in claim 13, wherein:

the notification unit reports at least one of the printer printing an image, completion of printing the image, and an error occurring while printing the image.

17. The control method of a printer described in claim 10, wherein the settings information is print settings information.

18. The control method of a printer described in claim 10, wherein the command is included in a print job received from the computing device.

* * * * *